United States Patent [19]

Legrand et al.

[11] Patent Number: 4,830,993
[45] Date of Patent: May 16, 1989

[54] PROCESS FOR THE MANUFACTURE OF A METAL OXIDE POWDER FOR CERAMIC MATERIALS AND ZIRCONIA POWDER PRODUCED BY THIS PROCESS

[75] Inventors: Franz Legrand, Quaregnon; Patricia Van den Bossche-De Bruycker; Luc Lerot, both of Brussels, all of Belgium

[73] Assignee: Solvay & Cie (Société Anonyme), Brussels, Belgium

[21] Appl. No.: 767

[22] Filed: Jan. 6, 1987

[30] Foreign Application Priority Data

Jan. 20, 1986 [FR] France .............................. 86 00833

[51] Int. Cl.$^4$ ....................... C01G 25/02; C04B 35/48
[52] U.S. Cl. ...................................... 501/103; 423/608
[58] Field of Search ......................... 501/103; 423/608

[56] References Cited

U.S. PATENT DOCUMENTS

| | | | |
|---|---|---|---|
| 4,501,818 | 2/1985 | Rossi | 501/103 X |
| 4,543,341 | 12/1985 | Barrington et al. | 501/103 X |
| 4,579,751 | 4/1986 | Forster | 427/54.1 |
| 4,605,631 | 8/1986 | Rossi | 501/103 X |

FOREIGN PATENT DOCUMENTS 0255622 5/1984 Japan .

OTHER PUBLICATIONS

Better Ceramics through Chemistry-Materials Research Society Symposia Proceedings, "Synthesis, Characterization, and Processing of Monosized Ceramic Powders", Fegley, et al., vol. 32, pp. 187–196 (1984).

*Primary Examiner*—William R. Dixon, Jr.
*Assistant Examiner*—James M. Hunter, Jr.
*Attorney, Agent, or Firm*—Spencer & Frank

[57] ABSTRACT

Process for the manufacture of a metal oxide powder for ceramic materials by the hydrolysis of a metal alcoholate in the presence of an acidic organic compound.

The process applies to the production of metal oxide powders, such as zirconia powders, with a mean particle diameter of between 0.05 and 2 microns.

13 Claims, 9 Drawing Sheets

PROCESS FOR THE MANUFACTURE OF A METAL OXIDE POWDER FOR CERAMIC MATERIALS AND ZIRCONIA POWDER PRODUCED BY THIS PROCESS

FIELD OF THE INVENTION

The invention relates to the manufacture of ceramic materials.

More particularly, it relates to a process for the manufacture of metal oxide powders intended for ceramic material use.

TECHNOLOGY REVIEW

It is well known that metal oxide powders can be prepared by the hydrolysis of metal alcoholates. To this end, a dilute solution of a metal alcoholate in an alcohol is generally prepared, and an alcoholic solution of water is poured into it. The reaction is generally performed under an inert nitrogen atmosphere, at ambient temperature. At the end of the process, the precipitated metal oxide powder is collected (Better Ceramics Through Chemistry—Materials Research Society Symposia Proceedings—Vol. 32—1984—Elsevier Science Publishing Co., Inc.—Bruce Fegley et al.: "Synthesis, characterization and processing of monosized ceramic powders", pages 187 to 197; U.S. Pat. No. 4,543,341).

In general, the metal oxide powders obtained at the outcome of this known process contain agglomerates, their particle size distribution is scattered and the particles are irregular in shape, and this is a disadvantage in the manufacture of ceramic materials.

The invention is aimed at overcoming this disadvantage by providing an improved process for the manufacture of metal oxide powders in the form of uniform spherical particles, in which the agglomerates are greatly reduced or even nonexistent and whose particle size distribution is relatively narrow.

Consequently, the invention relates to a process for the manufacture of a metal oxide powder for ceramic materials by the hydrolysis of a metal alcoholate, according to which the hydrolysis is performed in the presence of an acidic organic compound containing more than six carbon atoms in its molecule.

FIGS. 1-9 are illustrations of materials produced by the process of the invention.

Within the scope of the invention, ceramic materials are understood to denote nonmetallic inorganic materials whose use, starting with a powder, requires a high-temperature treatments, such as melting or sintering treatments (P. William Lee—"Ceramics"—1961—Reinhold Publishing Corp.—page 1; Kirk Othmer Encyclopedia of Chemical Technology—Third edition—Volume 5—1979; John Wiley & Sons, USA—pages 234 to 236: "Ceramics, scope").

SUMMARY OF THE INVENTION

In the process according to the invention the metal alcoholate denotes any compound in which a metal is linked by an oxygen atom to a hydrocarbon group such as an aromatic group or a saturated or unsaturated, straight-chain or cyclic aliphatic group which is unsubstituted or partly or completely substituted. Metal alcoholates containing aliphatic groups are especially recommended; those containing unsubstituted saturated aliphatic groups are preferred, such as, for example, the methyl, ethyl, n-propyl, isopropyl, n-butyl and isobutyl groups.

The purpose of the hydrolysis is to decompose the alcoholate using water, to produce the hydrated metal oxide and an alcohol. The operation may be carried out equally well with an excesss or a deficiency of water in relation to the quantity which is strictly necessary to decompose all the alcoholate.

DETAILED DESCRIPTION OF THE INVENTION

Figure 1:
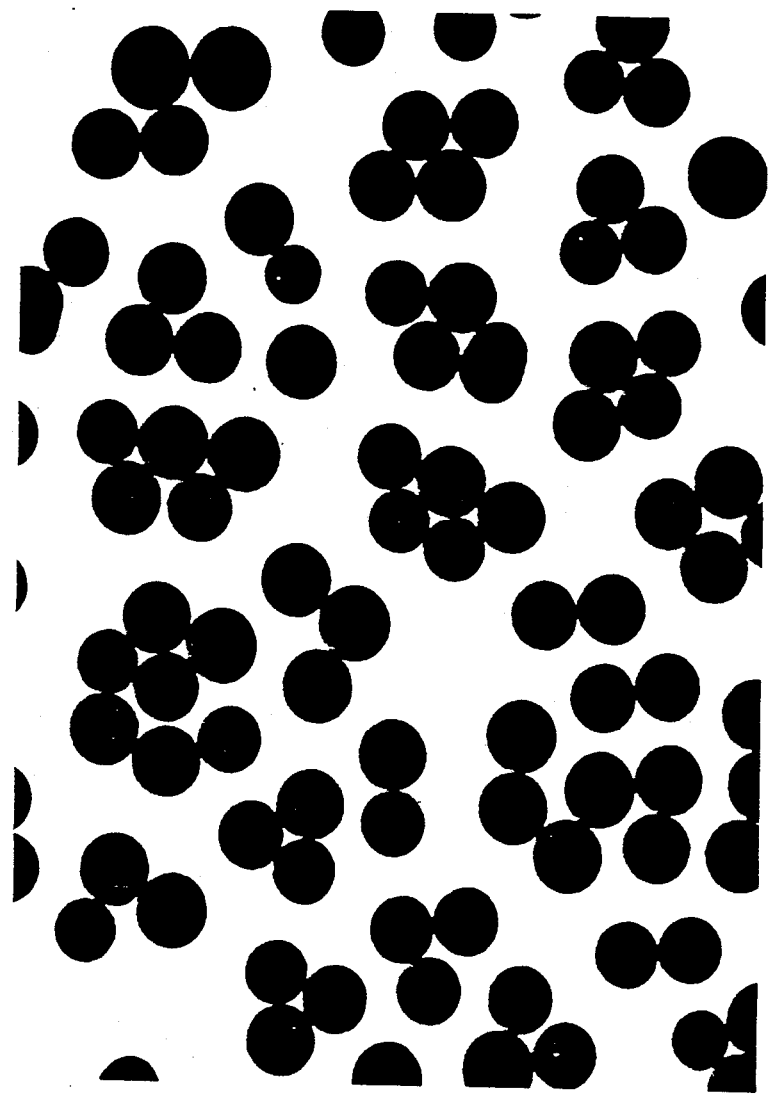

According to the invention, the hydrolysis is performed in the presence of an acidic organic compound.

An acidic organic compound is intended to denote any organic compound which is acidic in character, Saturated and unsaturated carboxylic acids and their derivatives are especially recommended. It is appropriate to choose acids or acid derivatives containing more than six carbon atoms in their molecule. Carboxylic acids which have been found especially advantageous are those containing at least eight carbon atoms in their molecule, such as octanoic, lauric, palmitic, isopalmitic, oleic and stearic acids.

The optimum quantity of acidic organic compound to be used depends both in the acidic compound chosen and on the metal alcoholate employed, and must be determined in each individual case, depending on the required quality in respect of the morphology of the ceramic powder. In general, it is appropriate to produce a molar ratio of the acidic organic compound to the metal alcoholate of at least $10^{-3}$. The acidic organic compound may be used in a molar quantity of between 0.005 and three times the molar quantity of the metal alcoholate. In the case of a carboxylic acid, the preferred molar ratios are those lying between 0.005 and 3; molar ratios between 0.015 and 0.35 are highly suitable.

In the implementation of the process according to the invention it is recommended to produce a homogeneous mixture of the alcoholate with water and the acidic organic compound as quickly as possible after the addition of water to the alcoholate, before nucleation of the metal oxide begins. To this end, the alcoholate and the water are advantageously used in the form of organic solutions. Where applicable, it is convenient for the organic solvent of the alcoholate to be free from water. Identical or different organic solvents may be used for, on the one hand, the alcoholate and, on the other hand, water. In the case where the alcoholate and the water are dissolved in different organic solvents, it is generally appropriate to choose miscible organic solvents. Alcohols and their derivatives are usually highly suitable, especially methanol, ethanol, n-propanol, isopropanol, n-butanol and isobutanol. It is furthermore appropriate to avoid the presence of solid particles in the organic solutions of the alcoholate and of water. Mixing of the solutions may be performed, for example, in the manner described in Patent Application GB-A-2,168,334.

The optimum dilution ratios of the alcoholate and of water in their respective organic solvents depend on various factors, particularly on the alcoholate employed, on the quantity and the nature of the acidic organic compound chosen, on the working temperature, on the degree of turbulence of the reaction medium and on the required quality in respect of the metal oxide powder; they need to be determined in each individual case by routine laboratory work. As a general rule, it is recommended that the organic solution of the alcoholate and the organic solution of water contain, respectively, less than 2 moles of metal alcoholate per liter and less than 5 moles of water per liter. Especially advantageous molar concentrations are those between 0.05 and 1 in the case of the metal alcoholate solution and between 0.1 and 3 in the case of the organic water solution.

The hydrolysis may be performed in ambient air. To avoid the risk of an uncontrolled decomposition of the metal alcoholate it is possible, according to a particular embodiment of the process according to the invention, to perform the hydrolysis under a moisture-free gas atmosphere. Dehydrated, dry air, nitrogen and argon are examples of atmospheres which may be used in this embodiment of the invention.

In principle, the temperature and the pressure are not critical. Generally, in the majority of cases, the work may be done at ambient temperature and at normal atmospheric pressure.

In the process according to the invention the acidic compound may be generally mixed with water or, preferably, with the metal alcoholate before the hydrolysis. Alternatively, the three components may also be mixed simultaneously.

The metal oxide produced at the outcome of the process according to the invention is generally in an amorphous, hydrated state and is in the form of a powder consisting of fine, generally spherical particles with a diameter which does not exceed 5 microns and is usually between 0.05 and 2 microns.

The powder may, if desired, be subjected to drying and to a heat treatment at an appropriate temperature, in order to remove the acidic organic compound, water and the organic solvents with which it is impregnated. The heat treatment may be regulated in order to control the porosity or to remove it completely. It may be regulated, furthermore, to produce crytallization of the metal oxide powder.

The process according to the invention finds, in particular, an advantageous application in the production of oxides of metals belonging to groups II, III and IV of the Periodic Table of the elements, by hydrolysis of alcoholates of these metals. It finds an advantageous application for the production of zirconia powders by the hydrolysis of zirconium alcoholate.

As a result, the invention also relates to metal oxide powders, particularly zirconia, produced by the process according to the invention and consisting of spherical particles whose diameter does not exceed 5 microns and is preferably between 0.05 and 2 microns.

The few examples whose description follows are used to illustrate the invention. These examples are given with reference to the attached figures, which are eight photographic reproductions of zirconia powders, at a magnification of 20,000×.

The examples relate to tests of the manufacture of zirconia powders according to the following operating procedure, according to the invention.

An organic solution of a zirconium alcoholate and a determined quantity of carboxylic acid were introduced into a reaction chamber maintained under an atmosphere of dry nitrogen at a temperature of 25° C. and the resultant mixture was subjected to moderate stirring for about ten minutes. After this, while the mixture continued to be vigorously stirred, a defined quantity of an organic solution of water was added to it all at once and the reaction mixture was left to mature for 2 hours. At the end of the maturation, the reaction mixture was centifuged and the zirconia powder was collected, washed with anhydrous ethanol and then dried by means of a stream of air at ambient temperature.

The examples, the mean diameter of the powders was calculated from measurements made on the photographic reproductions, the mean diameter being defined by the following relationship (G. Herdan—"Small particle statistics"—2nd edition—1960—Butterworths—pages 10 and 11):

$$d = \frac{\Sigma n_i d_i}{\Sigma n_i}$$

where $n_i$ denotes the number of particles of diameter $d_i$.

EXAMPLE 1

This example is characterized by the following particular operating conditions:

organic solution of zirconium alcoholate: 100 ml of a 0.2M solution of zirconium n-butoxide in ethanol;

carboxylic acid: $1.6 \, 10^{-3}$ mole of oleic acid; and organic solution of water: 100 ml of a 0.7M solution of water in ethanol.

The zirconia powder obtained is shown in FIG. 1. It has a mean particle diameter equal to 0.59 micron.

EXAMPLES 2 TO 4

These examples differ from Example 1 only in the choice of the carboxylic acid, which was:

octanoic acid (Example 2)
lauric acid (Example 3)
isopalmitic acid (Example 4).

Figure 2:
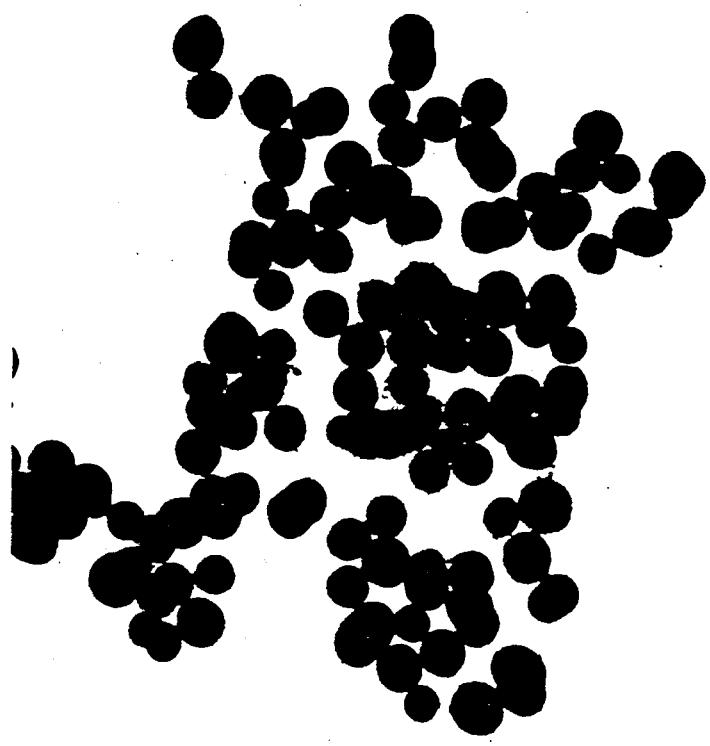
Figure 3:
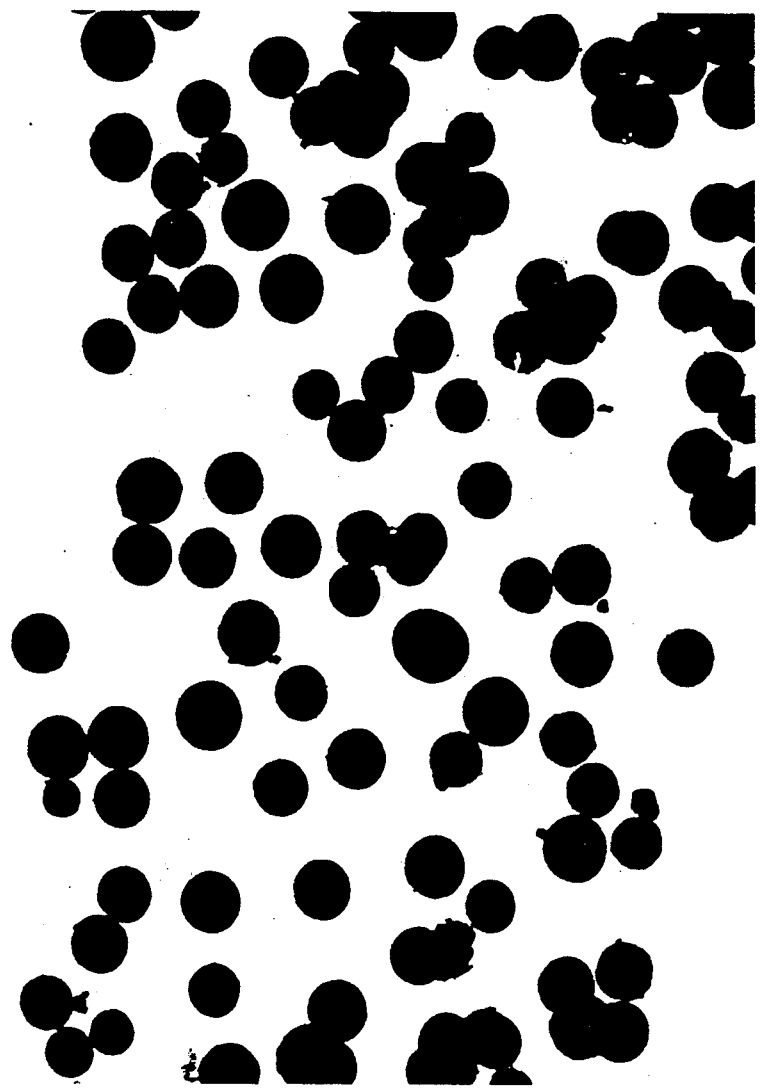
Figure 4:
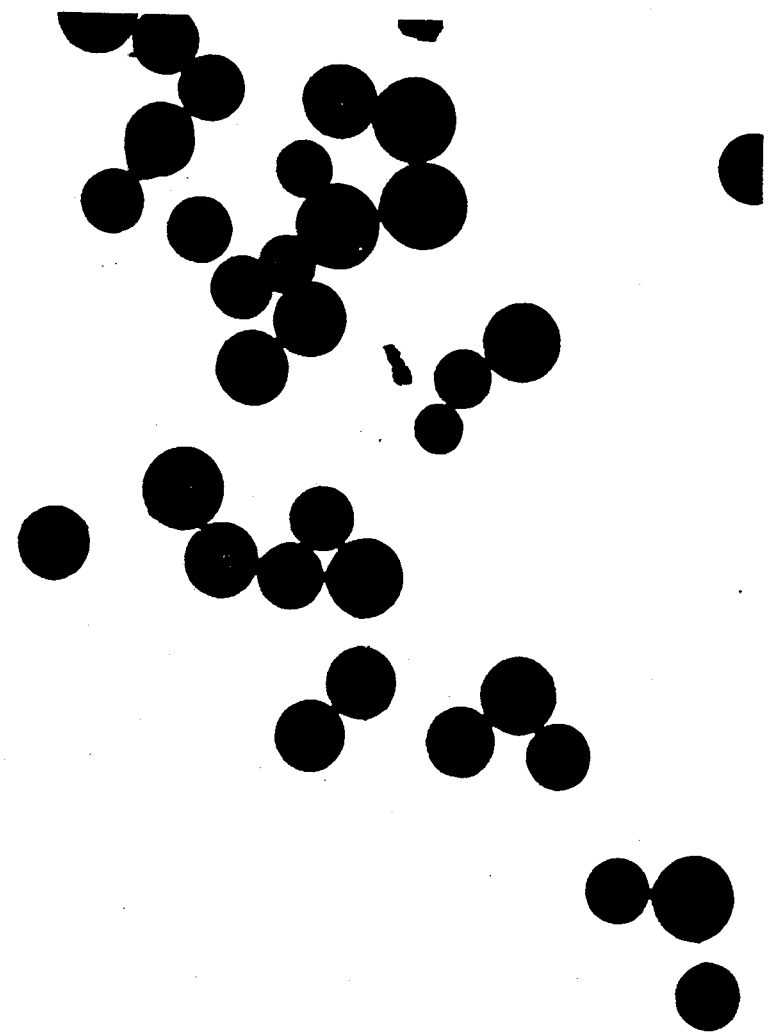

The mean particle diameters of the zirconia powders obtained in each test are listed in the following table. FIGS. 2 to 4 show specimens of these powders.

| Example No. | Acid | Mean particle diameter (micron) | FIG. No. |
| --- | --- | --- | --- |
| 2 | Octanoic | 0.35 | 2 |
| 3 | Lauric | 0.49 | 3 |
| 4 | Isopalmitic | 0.58 | 4 |

EXAMPLES 5 AND 6

These examples differ from Example 1 only in the quantity of oleic acid employed, which was:

Example 5: $0.96 \, 10^{-3}$ mole;

Example 6: $3.16 \, 10^{-3}$ mole.

Figure 5:
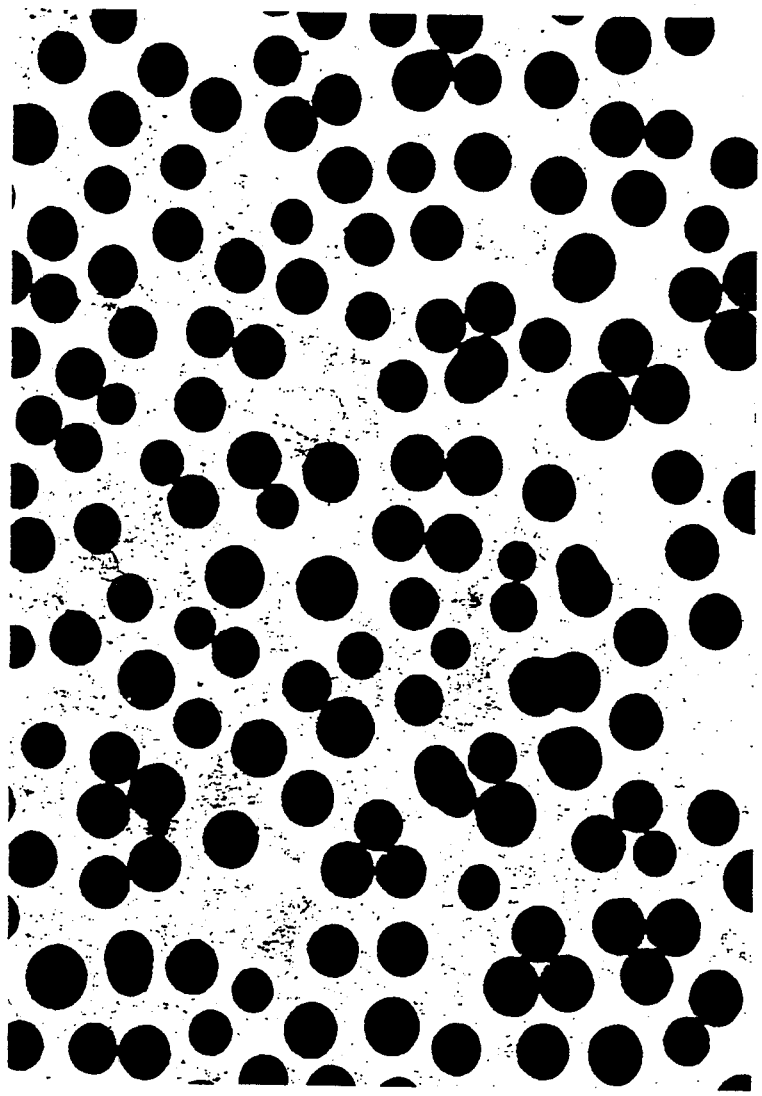
Figure 6:
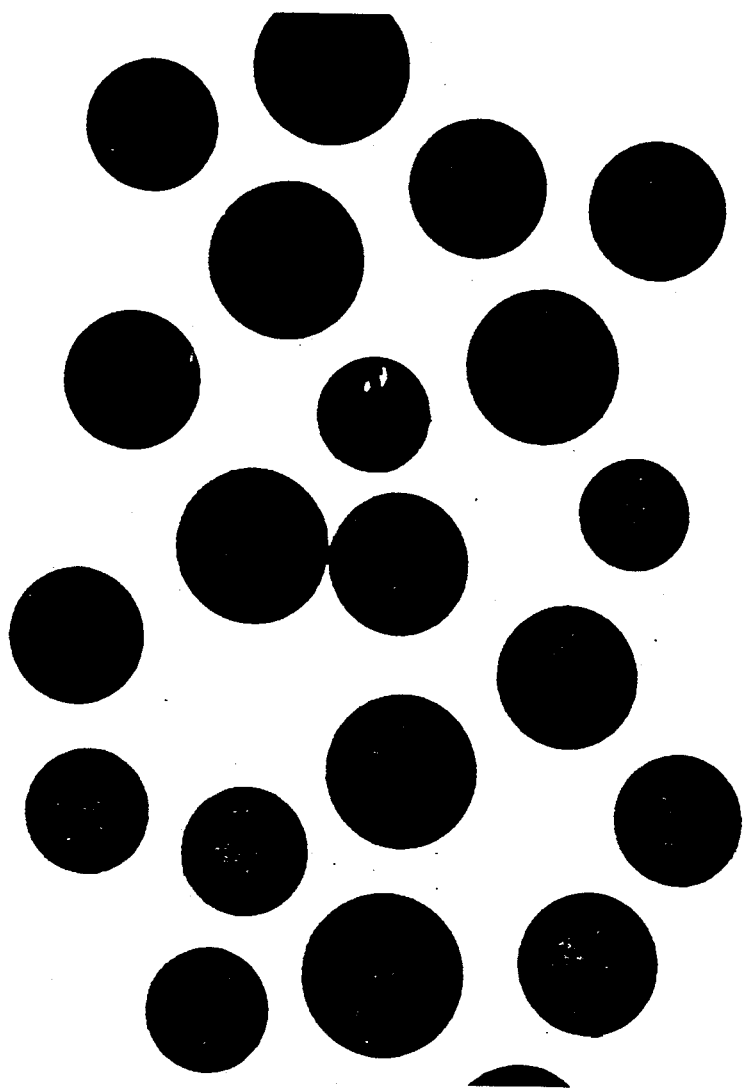

FIGS. 5 and 6 show specimens of powders obtained in the test of Example 5 and in the test of Example 6 respectively. These powders have been characterized by a mean particle diameter equal to:

Example 5: 0.46 micron;
Example 6: 1.20 micron.

EXAMPLE 7

This example differs from Example 1 in the choice of the alcoholate, which was zirconium n-propoxide. All the other conditions remained unchanged.

Figure 7:
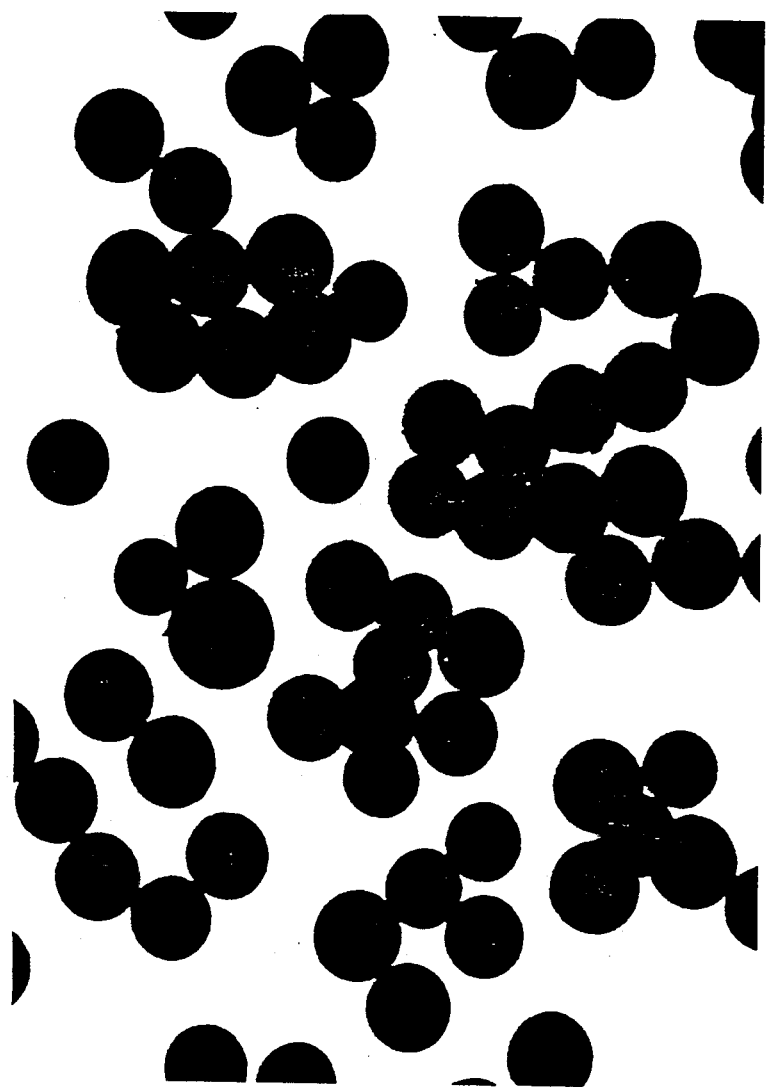

FIG. 7 shows a specimen of the zirconia powder obtained. This had a mean particle diameter equal to 0.70 micron.

EXAMPLE 8

This example is characterized by the following operating parameters:

organic solution of zirconium alcoholate: 100 ml of a 0.2M solution of zirconium n-propoxide in n-propanol;

carboxylic acid: $3.2 \times 10^{-3}$ mole of oleic acid; and organic solution of water: 100 ml of a 0.7M solution of water in n-propanol.

Figure 8:

The zirconia powder obtained is shown in FIG. 8. It had a mean particle diameter equal to 1.5 micron.

EXAMPLE 9

This example is characterized by the following operating conditions:

organic solution of zirconium alcoholate: 100 ml of a 0.2M solution of zirconium n-butoxide in n-butanol;

carboxylic acid: $6.4 \times 10^{-3}$ mole of oleic acid; and organic solution of water: 100 ml of a 0.7M solution of water in n-butanol.

The zirconia powder obtained had a mean particle diameter equal to 2.6 microns.

EXAMPLE 10

This example differs from the preceding examples in that the carboxylic acid was mixed with the organic water solution before the hydrolysis.

The operating conditions were as follows:

organic solution of zirconium alcoholate: 100 ml of a 0.2M solution of zirconium n-propoxide in n-propanol;

carboxylic acid: $3.8 \times 10^{-3}$ mole of oleic acid; and organic solution of water: 100 ml of a 0.7M solution of water in n-propanol.

The oleic acid was first mixed with the organic water solution and then the resultant homogeneous mixture was added, all at once, with vigorous stirring, to the organic solution of zirconium alcoholate.

At the end of a maturation period of 2 hours, the reaction mixture was centrifuged and the zirconia powder was collected, washed with anhydrous n-propanol and then dried under a nitrogen atmosphere at ambient temperature.

Figure 9:
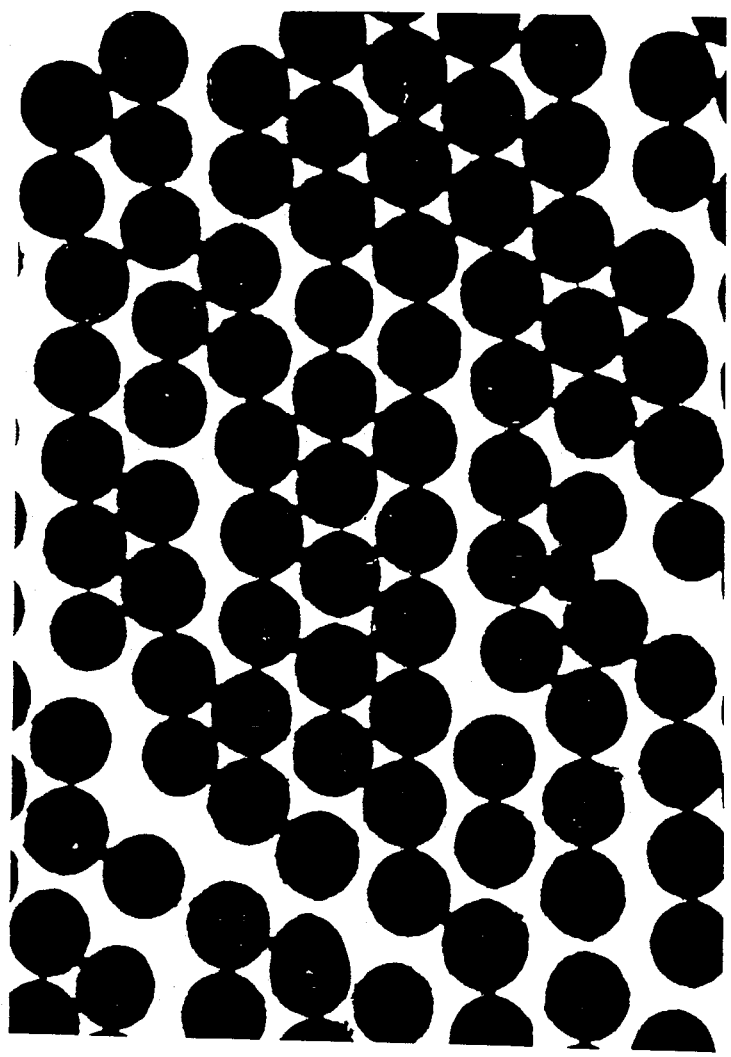

The zirconia powder obtained is shown in FIG. 9. It had a mean particle diameter equal to 0.73 micron.

We claim:

1. A process for the manufacture of a metal oxide powder for ceramic materials, comprising:

hydrolyzing a metal alcoholate in an organic solution in the presence of an acidic organic compound containing more than six carbon atoms in its molecule.

2. The process according to claim 1, in that the acidic organic compound is chosen from carboxylic acids containing more than six carbon atoms in their molecule.

3. The process according to claim 1, wherein the acidic organic compound is used in a molar quantity of between 0.005 and 3 times the molar quantity of the metal alcoholate.

4. The process according to claim 1, wherein the acidic organic compound is added to the metal alcoholate or to water, before the hydrolysis.

5. The process accoring to claim 1, wherein the metal alcoholate and the water are used in the form of organic solutions.

6. The process according to claim 5, wherein an alcoholic solution of the alcoholate, containing between 0.05 and 1 mole of alcoholate per liter and an alcoholic solution of water containing between 0.1 and 3 moles of water per liter are used.

7. The process according to claim 1, wherein, to perform the hydrolysis, the metal alcoholate, the water and the acidic organic compound are mixed so as to produce a homogeneous mixture before the nucleation of the metal oxide begins.

8. The process according to claim 1, wherein the metal alcoholate is chosen from the alcoholates of metals of groups II, III and IV of the Periodic Table of the elements.

9. The process according to claim 8, wherein the metal alcoholate contains zirconium alcoholate.

10. Metal oxide powder produced by a process according to claim 1, consisting of spherical particles whose diameter is between 0.05 and 2 microns.

11. Powder according to claim 10, wherein the metal oxide comprises zirconia.

12. A process for the manufacture of a metal oxide powder for ceramic materials, comprising:

dissolving an alcoholate of the metal in an organic solvent to prepare an organic solution of the metal alcoholate, treating the organic solution of the metal alcoholate with water in the presence of an acidic organic compound containing more than six carbon atoms in its molecule to hydrolyse th metal alcoholate and precipitate a metal oxide as a powder, and collecting said metal oxide powder.

13. A process according to claim 1, comprising treating the organic solution of the metal alcoholate with the acidic organic compound containing more than six carbon atoms in its molecule to precipitate the metal oxide as a powder of particles of between 0.05 and 5 microns in size.

* * * * *